US005786007A

United States Patent [19]

Webb

[11] Patent Number: 5,786,007
[45] Date of Patent: Jul. 28, 1998

[54] NUTRITIVE MAGNESIUM SULFITE/ MAGNESIUM SULFATE BINDER FOR ANIMAL FEED

[76] Inventor: Bob Webb, 2206 Aldo Blvd., Quincy, Ill. 62301

[21] Appl. No.: 674,201

[22] Filed: Jul. 1, 1996

[51] Int. Cl.$^6$ ............................ A23K 1/16; A23L 1/304
[52] U.S. Cl. ........................ 426/74; 426/2; 426/807
[58] Field of Search ........................ 426/74, 807, 2

[56] References Cited

U.S. PATENT DOCUMENTS

| | | | |
|---|---|---|---|
| 3,892,866 | 7/1975 | Kanemitsu | 426/72 |
| 4,171,385 | 10/1979 | Skoch et al. | 426/658 |
| 4,265,916 | 5/1981 | Skoch et al. | 426/74 |
| 4,508,737 | 4/1985 | Forest et al. | 426/807 |
| 4,631,192 | 12/1986 | Mommer et al. | 426/69 |
| 4,775,539 | 10/1988 | Van de Walle | 426/74 |
| 4,994,282 | 2/1991 | Miller | 426/74 |
| 4,996,065 | 2/1991 | Van de Walle | 426/72 |
| 5,082,639 | 1/1992 | Lee et al. | 423/242 |
| 5,264,227 | 11/1993 | Laroche et al. | 426/807 |
| 5,378,471 | 1/1995 | Smith | 424/442 |

*Primary Examiner*—Helen Pratt
*Attorney, Agent, or Firm*—Grace J. Fishel

[57] ABSTRACT

An animal feed binder, particularly for use in forming pellets. The binder is an anhydrous complex salt formed as a by-product in the desulfurization of fossil fuel combustion gases with magnesium oxide. The magnesium sludge from the desulfurization process is dewatered, dried and ground into a powder not larger than about minus 7 U.S. Sieve mesh. The anhydrous complex salt contains a major portion of magnesium sulfite (greater than 50% by weight to about 80% by weight) and a minor portion of magnesium sulfate (from about 15% by weight to about 45% by weight). An animal feed composition is formed by the admixture of a dry mixture of feed ingredients and the complex salt. When the animal feed composition is contacted with water or steam, it is conditioned by the heat of hydration of the complex salt and forms a hardened animal feed composition which can be extruded into pellets or formed into self-setting blocks. The binder is a nutritionally available source of soluble magnesium and sulfur and improves the strength and durability of the pellets or blocks.

10 Claims, No Drawings

NUTRITIVE MAGNESIUM SULFITE/ MAGNESIUM SULFATE BINDER FOR ANIMAL FEED

BACKGROUND OF THE INVENTION

1. Field of the Invention

The present invention relates to a binder for animal feed utilizing constituents which have nutritive value and which are waste by-products of the desulfurization of flue gas.

2. Brief Description of the Prior Art

Various processes have been provided for the removal of sulfur dioxide from gaseous streams, such as combustion gases from fossil fuel-fired power plants, so as to reduce acidic components discharged into the air and prevent pollution of the environment (i.e., the emission of sulfur containing acids, resulting in so-called "acid rain"). The most common process for removing sulfur dioxide from flue gases is a wet process where the flue gases are contacted in a wet scrubbing unit with lime. Such a process, however, produces an aqueous sludge of primarily calcium sulfate which is difficult to dewater. Magnesium ions have been added to enhance the scrubbing process and modifiers have been added to provide better dewatering of the aqueous sludges, thereby partly improving efficiency.

The control of sulfur dioxide emissions is mandated by the United States Environmental Protection Agency (EPA) under the Clean Air Act which established emission limits for power plants constructed or modified after Aug. 17, 1971. This Act spurred research to develop better methods for the removal of sulfur dioxide from flue gases in order to meet the emission limits. In one such method, magnesium oxide, instead of lime, is used in a wet scrubbing process as magnesium oxide is more efficient with respect to the amount of sulfur dioxide removed than lime.

Sludges from desulfurization of flue gas with magnesium oxide (magnesia) can be dewatered and dried to form a substantially anhydrous complex salt containing about 50% by weight magnesium sulfite and 25% by weight magnesium sulfate. While the magnesium oxide sludges, either in wet or dry form, can be used as fertilizer, material handling costs have heretofore made this use prohibitive, and the dried material is presently buried as landfill. Since magnesium sulfite and magnesium sulfate are both soluble, this method of disposal also has potential, negative environmental effects. The present invention concerns the use of the by-product of desulfurization as a binder for animal feeds thereby improving the efficiency of the desulfurization process and providing a soluble source of magnesium and sulfur in the feed.

Animal feeds are frequently bound together into pellets or blocks, which practice has several advantages: (1) bound feeds prevent selective feeding on those ingredients in the formulation which are more palatable, (2) bound feeds prevent segregation of the constituents on the basis of size and density and (3) bound feeds have a higher bulk density, which is advantageous for shipping and handling. Binders are added to pelleted feeds to improve the strength and durability of the pellets and to reduce fines produced during the pelleting process or shipment. One of the most commonly used ingredients for this purpose is molasses. Other commonly used binders for pellets include clays, lignin sulfonates and gums.

Clays such as bentonite and attapulgite are inexpensive but provide no nutritive value. In addition, it takes more clay to form an effective binder, particularly with feeds with a high corn or fat content, thereby eroding the clay's price advantage over lignin sulfonates and gums, and sometimes requiring that some of the nutrients in the formula be deleted to make room for the clay.

Lignin sulfonates are by-products of the paper and pulp industry and are sold in liquid and dry form. They are commonly used in feeds at rates from about 1.5 to 3.5 percent by weight and are standards against which other binders are benchmarked. Lignin sulfonates, like clays, have substantially no nutritive value. The use of lignin sulfonate by-products in liquid form as feed binders requires special mixing equipment and is economic only if the liquid by-product is shipped a short distance.

Gums are more expensive than lignin sulfonates but are normally employed at a much lower concentration, in the range of 0.05 to 0.2 percent by weight. At this low inclusion rate, however, it is difficult to get the binder thoroughly mixed with the feed within practical time constraints.

In addition to clays, lignin sulfonates and gums, others (e.g., U.S. Pat. No. 4,775,539 to Van de Walle, assigned to Martin Marietta Corporation) have used a combination of calcium magnesium oxide (an example of a so-called "reactive salt") and magnesium potassium sulfate (an example of a so-called "reactive metal oxide or hydroxide") at a level of 2% by weight (within a stated range of 0.25 to 5 percent by weight) and in a ratio of two to one (within a stated range of 4:1 to 1:4) as a pellet binder for feeds. The calcium magnesium oxide and the magnesium potassium sulfate are said to react as the temperature of the feed is increased, which action is said to be increased by the addition of steam to the mix.

SUMMARY OF THE INVENTION

In view of the above, it is an object of the present invention to provide a binder for animal feeds, particularly pelleted or compressed animal feeds, using an anhydrous complex salt formed as a by-product of desulfurization of flue gas with magnesium oxide. It is another object to provide a binder which has nutritive value because it is a source of soluble magnesium and sulfur. It is another object to provide an environmentally beneficial use for the above-mentioned by-product, producing pellets with a Pellet Durability Index comparable (or better) than pellets produced with lignin sulfonate binders, against which it is compared. Other objects and features of the invention will be in part apparent and in part pointed out hereinafter.

In accordance with the invention, an animal feed composition is formed by making an admixture of a dry mixture of feed ingredients and a binder comprising from about 0.1% to 5.0% by weight of the total mixture. The binder is a substantially anhydrous complex salt formed as a by-product in the desulfurization of fossil fuel combustion gases with magnesium oxide, said anhydrous complex salt containing a major portion of magnesium sulfite (greater than 50% by weight to about 80% by weight) and a minor portion of magnesium sulfate (from about 15% by weight to about 45% by weight).

The invention summarized above comprises the compositions hereinafter described, the scope of the invention being indicated by the subjoined claims.

DETAILED DESCRIPTION OF THE INVENTION

The feed binder of the present invention is a substantially anhydrous complex salt containing a major portion of magnesium sulfite (greater than 50% by weight to about 80% by weight) and a minor portion of magnesium sulfate (from about 15% by weight to about 45% by weight), about 1 to 2% by weight or less water, with the balance being silica, other insolubles and trace amounts of other, preferably inert, substances. The complex salt is preferably formed as a by-product in the desulfurization of fossil fuel combustion gases with magnesium oxide, such as in a coal-fueled power plant, in which case it preferably contains about 70 to 75% by weight magnesium sulfite and about 25 to 30% by weight magnesium sulfate. Typically, flue gases are contacted with magnesium oxide in a wet scrubbing unit, forming an aqueous sludge which is dewatered and dried to form the above-mentioned complex salt which is then ground.

When the fossil fuel is coal from Southeastern Pennsylvania, a complex anhydrous salt containing about 50% by weight magnesium sulfite and 25% by weight magnesium sulfate is formed. The complex salt contains less that about 0.0003% by weight heavy metals such as lead, cadmium, arsenic and mercury and substantially all of the magnesium and the sulfur is water soluble. Magnesium and sulfur are widely recognized as essential elements for proper nutrition in a variety of animal feeding programs. In the complex salt formed from the desulfurization of combustion gases of coal, 18.2% by weight out of 18.4% by weight of the magnesium is water soluble and 22.8% by weight out of 23.5% by weight of the sulfur is water soluble. The binder of the present invention therefore serves a dual function: serving as a feed binder and a source of nutrition, eliminating the necessity of adding that amount of magnesium and sulfur provided by the binder.

The binder of the present invention can be used as a feed binder for pellets and self-setting blocks at levels of from about 0.10% by weight to about 5% by weight of the total feed formulation. The most preferred levels of use being from 0.20% to 2.0% by weight of the total feed formulation. When the complex salt is used for pellets, no other binding agents, such as molasses, clays, or lignin sulfonates are necessary, however they can be added if desired. In self-setting blocks, the binder of the present invention is more typically used with other binding agents. Particle size is important, finer mesh material being preferred because it is easier to mix into the feed, although not so much preferred, in general, as to justify the additional work needed to grind the complex salt to a finer consistency. Appropriate particle size can range from not greater than about minus 7 mesh, U.S. Sieve Scale, and preferably not smaller than minus 325 mesh, with the preferred size range being from about 20 mesh to about 325 mesh.

When the anhydrous complex salt is used as a feed binder in pellets, the feed ingredients may be chosen from a listing including, but not limited to, dehydrated alfalfa, barley, beet pulp, blood meal, brewers grain, buttermilk, citrus pulp, coconut meal, corn, corn cob meal, corn gluten feed, corn gluten meal, corn oil meal, cotton seed meal, distillers grain, distillers solubles, fish meal, grease, hominy, kefir corn, kefir head chop, linseed meal, meat scrap, milo maize, milo head chop, molasses, oats, oat hull, oat screening, peanut meal, rice bran, rice polishing, soybean meal, spent soy flakes, tallow, wheat, wheat middlings, wheat flour, wheat bran, whey, bone meal, urea, plus others, and are uniformly mixed. In addition, minerals and mineral supplements, vitamins and various drug and drug combinations may also be incorporated.

In the practical use of this invention, the anhydrous complex salt binder (i.e., anhydrous magnesium sulfite and anhydrous magnesium sulfate, $MgSO_3 \cdot MgSO_4$) of the present invention is added to a feed formulation containing various ground feed ingredients, minerals, vitamins and drug additives. The mixture is usually blended in a ribbon mixer or vertical mixer in several ton batches to form a meal mixture which is then delivered to a pellet mill.

Upon arrival at the pellet mill, the meal mixture is first passed through a conditioning chamber. In the conditioning chamber, the entire meal mixture is subjected to steam prior to the actual pelleting step. Most liquids, such as molasses, when present in the formulation, are added in the conditioning chamber. Steam conditioning supplies moisture for lubrication and partly gelatinizes the starches. Steam addition also activates the complex salt, causing it to add water of hydration and forming a hydrated salt which is believed to be $MgSO_3 \cdot 6H_2O/MgSO_4 \cdot 7H_2O$. The amount of total moisture which is contained in the feed mixture is normally raised to a level of from about 12% to 16% by weight of the feed formulation, as a result of liquid and steam addition. The hydration of the complex salt is an exothermic reaction which raises the temperature of the mixture about 90° F. above ambient. The mix is further heated as a result of the steam addition to a temperature of about 150° F. which also increases the rate of reaction of the binder ingredients.

The conditioned feed is called a mash and is fed into the pellet mill die chamber. In the die chamber, usually two or three rollers push the softened mash through holes in a circular die. Typically the hole diameter of these dies is 9/32 inch to 1/4 inch. Knives positioned outside of the die cut the densified pellet to proper length.

Typically, the formed pellets have temperatures in a range from about 150° F. to about 210° F. Hot pellets are usually cooled by forced air through vertical cooling systems to near ambient temperature.

One novel aspect of the present invention is that the binder of this invention, uniformly mixed with the feed prior to the steam conditioning step, provides a heat of hydration that heats the meal mixture in the conditioning step thereby increasing the rate of reaction of the binder ingredients. In addition, the binder provides feed nutrient value (i.e., a soluble source of magnesium and sulfur) while producing pellets with a Pellet Durability Index as good or better than lignin sulfonate binders used at the same usage level.

The following examples illustrate the invention.

EXAMPLE 1

A substantially anhydrous magnesium sulfite/magnesium sulfate compound is produced during the desulfurization of flue gas with magnesium oxide in a coal-fired power plant in Philadelphia, Pa. The magnesium sludge from the desulfurization is dewatered, dried to a cake and ball milled to produce a material having the following chemical analysis and physical properties:

| Substance | Weight % |
| --- | --- |
| Magnesium sulfite | 52.44 |
| Magnesium sulfate | 25.50 |
| Sulfur trioxide | 14.30 |
| Magnesium oxide | 0.01 |
| Water | 1.15 |
| Carbon | 0.29 |
| Aluminum oxide | 0.12 |
| Calcium oxide | 0.64 |
| Iron oxide | 0.29 |
| Crystalline quartz | 1.00–5.00 |
| Amorphous silica | 0.04 |

-continued

| Substance | Weight % |
| --- | --- |
| Barium oxide | 0.001 |
| Titanium oxide | <0.008 |
| Potassium oxide | 0.005 |
| Chromium oxide | 0.0002 |
| Arsenic | 0.0003 |
| Silver oxide | <0.0001 |
| Cadmium oxide | 0.0003 |
| Lead oxide | 0.0003 |
| Selenium oxide | <0.00001 |
| Mercury | <0.00001 |
| pH | 9.80 |
| Density (lbs/ft$^3$) | 50.50 |

EXAMPLE 2

A sample of the material described in Example 1 was submitted for sieve analysis to determine the general sizing of the material. The material was analyzed using Taylor screens and a Roto-Tap sieve shaker.

In the following table a positive sign in front of the screen size indicates the amount of material retained on that screen. A negative sign indicates the amount of material passing through that screen (ASTM E-11-61).

| U.S. Sieve Series | WT % |
| --- | --- |
| + 20 Screen | 4.8 |
| + 40 Screen | 17.8 |
| + 50 Screen | 10.9 |
| + 100 Screen | 14.8 |
| + 200 Screen | 12.5 |
| + 300 Screen | 27.0 |
| + 325 Screen | 4.2 |
| − 325 Screen | 8.0 |

EXAMPLE 3

A portion of the material described in Example 1 was split into three samples. Sample A was not treated with anti-cake. Sample B was treated with Zeofree 80 (0.5% addition) and Sample C was treated with Zeofree 80 (1% addition). Zeofree 80 is a trademark of J. M. Huber Corporation and is a fumed silica.

Each sample was divided into two parts. One part was left in an open tray at room temperature and humidity. The other part was left in an open beaker and placed under a bell jar in which the temperature was slightly higher and the humidity elevated.

Within three days, Sample A which was stored in the bell jar had become hard. After two weeks, none of the other samples showed any signs of caking.

Desiccants, anti-caking or flow facilitating agents such as Zeofree 80 may be added to the binder and may even prove to be required in some circumstances, depending on whether the binder is shipped in bulk, packaged in polyethylene lined bags and so forth.

EXAMPLE 4

A dairy concentrate was prepared by blending a 700 lb batch of feed in a Forberg (F-500) mixer, each of three times for each formula to obtain data for statistical analysis. The formula for the CONTROL was as follows:

| CONTROL | Weight % |
| --- | --- |
| Ground Corn | 48.80 |
| Wheat Middlings | 25.00 |
| Cottonseed Meal | 7.6 |
| Soybean Meal (48% CP) | 7.6 |
| Alfalfa, dehydrated (17% CP) | 5.0 |
| Liquid Molasses | 4.90 |
| Monocalcium Phosphate | 1.00 |
| Vitamin ADE Premix | 0.10 |
| Total | 100.00 |

Three additional formulations were prepared, substituting the following binders on a weight for weight basis for ground corn at the indicated level: BENTONITE, 30 lb/ton; AMERIBOND 2X, 10 lb/ton and MAGBOND, 20 lb/ton. AMERIBOND 2X is a registered trademark of Lignotech, Inc. and is composed of lignin sulfonate. MAGBOND is a trademark of the Webb Company, for which a federal trademark application has been filed. The material described in Examples 1 and 2 is MAGBOND.

The prepared meal for each run was pelleted with a CPM 1000 series "Master H.D." model pellet mill equipped with a ³⁄₁₆"×1½" die. The conditioning temperature was 65° C. Data collection started once the mill stabilized at the target temperature.

Production rate, fines produced, hot pellet temperature, conditioned mash temperature and motor amperage and voltage were recorded. Pellet quality was determined and electrical energy calculated. The production rate was determined by diverting the flow of pellets to a double-pass horizontal cooler after the pellet mill stabilized at the selected processing conditions. The pellet run time was recorded and screened pellets and fines were collected and weighed. Production rate was calculated based on whole pellets produced during the production run.

The fines from the screening process were weighed and used to calculate percent fines based on the amount of screened pellets. The pellets were collected in an insulated container after leaving the pellet mill die. The hot pellet temperature was recorded with a probe thermometer. The temperature of the mash was recorded as it left the conditioning chamber and entered the pellet die. A recording amp-voltmeter recorded total electrical energy consumption on the main drive motor. Electrical energy consumption was calculated based on total and net amps required to produce whole (screened) pellets.

The pellets were cooled with ambient air prior to pellet durability testing. The Pellet Durability Index (PDI) was determined using the industry standard procedure (ASAE S269.1). Two sub-samples were tested according to the ASAE procedure and two sub-samples were tested by modifying the test and adding five ½" hexagonal nuts to increase the stress on the pellets.

The data collected from each replication are reported in the following table:

| | | PRODUCTS | | | |
| --- | --- | --- | --- | --- | --- |
| ITEM | REP | CON-TROL | BENTONITE | AMERI-BOND 2X | MAG-BOND |
| Standard PDI, % | 1 | 93.90 | 95.55 | 95.81 | 96.43 |
| | 2 | 95.46 | 95.39 | 95.82 | 95.90 |
| | 3 | 95.51 | 94.22 | 95.01 | 95.58 |
| Modified PDI, %* | 1 | 91.73 | 94.52 | 95.05 | 96.03 |
| | 2 | 94.19 | 94.20 | 94.70 | 95.07 |

-continued

| ITEM | REP | CON-TROL | BENTONITE | AMERI-BOND 2X | MAG-BOND |
|---|---|---|---|---|---|
| | 3 | 94.20 | 92.63 | 93.91 | 94.61 |
| PRODUCTION | 1 | 2387.54 | 2416.71 | 2466.00 | 2436.89 |
| RATE, LBS/HR | 2 | 2310.64 | 2399.57 | 2402.14 | 2371.07 |
| | 3 | 2308.60 | 2278.93 | 2213.20 | 2378.57 |
| FINES, % | 1 | 2.36 | 2.18 | 2.10 | 1.81 |
| | 2 | 2.14 | 2.17 | 1.32 | 2.23 |
| | 3 | 2.37 | 2.40 | 2.21 | 2.19 |
| NET ENERGY | 1 | 7.77 | 6.25 | 6.17 | 6.76 |
| KWH/TON | 2 | 6.26 | 6.47 | 6.21 | 5.92 |
| | 3 | 6.37 | 6.50 | 6.28 | 6.08 |
| TOTAL | 1 | 14.18 | 12.58 | 12.37 | 13.04 |
| ENERGY | 2 | 12.90 | 12.87 | 12.60 | 12.37 |
| KWH/TON | 3 | 13.05 | 13.24 | 13.23 | 12.58 |
| CONDITIONED | 1 | 65.56 | 66.67 | 65.56 | 65.56 |
| MASH TEM- | 2 | 65.56 | 65.56 | 65.56 | 65.56 |
| PERATURE, °C. | 3 | 65.56 | 65.56 | 65.56 | 65.56 |
| HOT PELLET | 1 | 73.33 | 71.67 | 73.89 | 72.22 |
| TEMPERA- | 2 | 73.33 | 75.56 | 72.22 | 73.89 |
| TURE, °C. | 3 | 73.89 | 73.30 | 73.89 | 73.33 |
| DELTA | 1 | 7.77 | 5.00 | 8.33 | 6.66 |
| TEMPERA- | 2 | 7.77 | 10.00 | 6.66 | 8.33 |
| TURE, °C. | 3 | 8.33 | 7.74 | 8.33 | 7.77 |

[a]Pellet durability procedure with the inclusion of five ½ inch hexagonal nuts.

The data from the three replications for each formula were analyzed with the general linear model (GLM) of SAS and treatment means separated using the least significant difference (LSD) procedure for comparison of treatment means. The results are reported below:

| ITEM | CON-TROL | BENTO-NITE | AMERI-BOND 2X | MAG-BOND |
|---|---|---|---|---|
| Standard PDI, %[a] | 94.96 | 95.05 | 95.55 | 95.97 |
| Modified PDI, %[a,b] | 93.37 | 93.78 | 94.55 | 95.24 |
| PRODUCTION RATE, LBS/HR[a] | 2335.59 | 2365.07 | 2360.45 | 2395.51 |
| FINES, %[a] | 2.29 | 2.25 | 1.88 | 2.08 |
| NET ENERGY KWH/TON[a] | 6.80 | 6.41 | 6.22 | 6.25 |
| TOTAL ENERGY KWH/TON[a] | 13.38 | 12.90 | 12.73 | 12.66 |
| CONDITIONED MASH TEMPERATURE, °C.[a] | 65.56 | 65.93 | 65.56 | 65.56 |
| HOT PELLET TEMPERATURE, °C.[a] | 73.52 | 73.51 | 73.33 | 73.15 |
| DELTA TEMPERATURE, °C.[a] | 7.96 | 7.58 | 7.77 | 7.59 |

[a]No statistical difference (P > .05).
[b]Pellet durability procedure with the inclusion of five 1/2 inch hexagonal nuts.

In this example, the CONTROL, BENTONITE and AMERIBOND 2X binders were for purposes of comparison with MAGBOND, a feed binder in accordance with the present invention.

EXAMPLE 5

Two pellet binders (AMERIBOND 2X and MAGBOND) were evaluated at a manufacturing plant. The binders were used with formulas selected from a normal day's production. Both formulas were typical dairy feeds. Formula A was a high protein supplement and Formula B was a complete dairy feed. These formulas were selected because they present completely different pelleting challenges. The animal protein and fat in Formula A have a normal tendency to reduce die retention times and thus lower the delta temperature independent of the pellet binder used. The ingredient combination in Formula B has a tendency to be hard to start and push through the dies, causing the dies to plug, possibly increasing die retention and raising delta temperature independent of pellet binder.

The composition of Formula A and Formula B is given in the following table:

| FORMULA COMPOSITION | Formula A (%) | Formula B (%) |
|---|---|---|
| Soybean Meal 48% | 10.70 | 11.50 |
| Corn | 0.00 | 36.815 |
| SoyPlus[a] | 4.00 | 0.00 |
| Corn Gluten Meal 60% | 20.00 | 0.00 |
| Corn Gluten Feed | 0.00 | 4.00 |
| Corn Distiller Grains | 2.00 | 12.00 |
| Wheat Middlings | 31.405 | 27.25 |
| 58% MP Blend[b] | 7.00 | 0.00 |
| Molasses | 0.00 | 4.00 |
| Agway Base[c] | 13.00 | 0.00 |
| Urea | 2.00 | 0.00 |
| Tallow | 1.60 | 0.00 |
| Dical Phos[d] | 1.62 | 0.75 |
| Agmate/kms[e] | 0.25 | 0.50 |
| Salt | 2.00 | 1.00 |
| ZinPro 40[f] | 0.00 | 0.15 |
| Limestone | 3.30 | 1.25 |
| Selenium .06% | 0.30 | 0.20 |
| Dairy TM[g] | 0.225 | 0.035 |
| Vit ADE 3X[h] | 0.100 | 0.05 |
| Pellet Binder AMERIBOND 2X or MAGBOND | 0.50 | 0.50 |

[a]SoyPlus is soybean expeller meal, containing about 4% by weight fat
[b]58% MP Blend is meat and poultry meal, containing about 58% by weight protein
[c]Agway Base is a mixture of blood, fish and feather meals
[d]Dical Phos is dicalcium phosphate
[e]Agmate/kms is potassium magnesium sulfate
[f]Zinpro 40 is zinc methionine
[g]Dairy TM is a trace mineral mix containing iron, manganese, copper, zinc, cobalt and iodine
[h]Vit ADE 3X is a mixture of vitamins A, D and E.

Production runs of Formula A and Formula B (six ton each) were divided into two equal sub-samples. Each sub-sample was treated with AMERIBOND 2X or with MAGBOND at 10 lbs per ton. The prepared meal was then passed through two Sprout Bower pellet mills. Each mill was equipped with an $^{11}/_{64}$"×2½" die. Both dies were 26" in diameter with a 6" face. One mill was powered with a 200 horsepower motor and the other with a 150 horsepower motor. Sub-samples were pelleted in sequence through the same mill.

Data was collected and is reported in the following table. The estimated production rate was recorded from the automated system after the system stabilized at the target temperature. The conditioned mash temperature was recorded as it exited the conditioning chamber and entered the pellet die. Hot pellets were collected in an insulated container after leaving the pellet mill die and the temperature was determined and recorded with a probe thermometer.

| | AmeriBond 2X | MAGBond |
|---|---|---|
| FORMULA A: | | |
| Estimated Production Rate (ton/hr) | 9 | 9 |
| Pellet Mill Motor (AMPS) | 153 | 154 |
| Conditioned Mash Temperature (°F.) | 155 | 155 |

-continued

|  | AmeriBond 2X | MAGBond |
|---|---|---|
| Hot Pellet Temperature (°F.) | 170 | 170 |
| Delta Temperature (°F.) | 15 | 15 |
| FORMULA B: | | |
| Estimated Production Rate (ton/hr) | 6 | 6 |
| Pellet Mill Motor (AMPS) | 180 | 150 |
| Conditioned Mash Temperature (°F.) | 135 | 142 |
| Hot Pellet Temperature (°F.) | 158 | 170 |
| Delta Temperature (°F.) | 23 | 28 |

The pellets were cooled with ambient air prior to pellet durability testing. A Pellet Durability Index value was determined as follows: The pellets to be tested were screened over a US #8 screen to obtain at least 100 grams of clean pellets. One hundred (100) grams of clean pellets were enclosed in a tumbler cylinder measuring 14+/−¼" in length by 2⅞+/−⅛" inside diameter. A set of 5 aluminum balls weighing no less than 124.0 grams were placed in the cylinder to increase the stress on the pellets. The pellets were tumbled for 5 minutes at 33+/−1 RPM. The pellets were then removed from the cylinder and screened over a US #8 screen. The material remaining on the US #8 screen was weighed and the Pellet Durability Index calculated. The results are reported in the following table:

| PELLET DURABILITY INDEX VALUES | | |
|---|---|---|
|  | AmeriBond 2X | MAGBond |
| FORMULA A: | | |
| Sample A | 94.1 | 95.1 |
| Sample B | 93.1 | 94.1 |
| Sample C | 95.1 | 94.7 |
| Sample D | 93.8 | 94.0 |
| Average | 94.02 | 94.5 |
| FORMULA B: | | |
| Sample A | 95.6 | 95.1 |
| Sample B | 95.0 | 93.9 |
| Sample C | 94.1 | 95.6 |
| Sample D | 93.5 | 94.8 |
| Average | 94.55 | 95.85 |

In view of the above, it will be seen that the several objects of the invention are achieved and other advantageous results attained. As various changes could be made in the above compositions without departing from the scope of the invention, it is intended that all matter contained in the above description or shown in the accompanying drawings shall be interpreted as illustrative and not in a limiting sense.

What is claimed:

1. An animal feed composition for pelleting or forming into blocks comprising a dry mixture of feed ingredients and a binder therefor, said binder comprising from about 0.1% to 5.0% by weight of the total mixture, said binder comprising a substantially anhydrous complex salt formed as a by-product in the desulfurization of fossil fuel combustion gases with magnesium oxide, said anhydrous complex salt containing greater than 50% to about 80% by weight magnesium sulfite and from about 15 to 45% by weight magnesium sulfate.

2. The animal feed composition of claim 1 wherein said anhydrous complex salt contains 2% by weight or less of water and from about 70 to 75% by weight magnesium sulfite and about 25 to 30% by weight magnesium sulfate.

3. An animal feed composition for pelleting comprising a dry mixture of feed ingredients and a binder therefor, said binder comprising from about 0.2% to 2.0% by weight of the total mixture, said binder comprising a substantially anhydrous complex salt formed as a by-product in the desulfurization of fossil fuel combustion gases with magnesium oxide, said anhydrous complex salt containing greater than 50% to about 80% by weight magnesium sulfite and from about 15 to 45% by weight magnesium-sulfate.

4. The animal feed composition of claim 3 wherein the anhydrous complex salt contains 2% by weight or less of water and is produced in the desulfurization of coal combustion gases as a magnesium sludge which is dewatered, dried into a cake and ground.

5. The animal feed composition of claim 4 wherein the anhydrous complex salt has a particle size not greater than about minus 7 U.S. Sieve mesh.

6. The animal feed composition of claim 5 wherein the anhydrous complex salt has a particle size from about 20 to 325 U.S. Sieve mesh.

7. An animal feed composition for pelleting consisting essentially of a dry mixture of feed ingredients and a binder therefor, said binder comprising from about 0.2% to 2.0% by weight of the total mixture, said binder comprising a substantially anhydrous complex salt formed as a by-product in the desulfurization of coal combustion gases with magnesium oxide as a magnesium sludge which is dewatered, dried into a cake and ground, said anhydrous complex salt containing between about 70 and 75% by weight magnesium sulfite and between about 25 and 30% by weight magnesium sulfate and has a particle size from about 20 to 325 U.S. Sieve mesh.

8. The animal feed composition of claim 7 wherein the anhydrous complex salt contains less than about 0.0003% by weight heavy metals selected from the group consisting of lead, cadmium, arsenic and mercury.

9. The animal feed composition of claim 8 wherein substantially all of the magnesium of sulfur in the binder is water soluble.

10. The animal feed composition of claim 9 wherein the anhydrous salt contains 2% by weight or less of water.

* * * * *